United States Patent Office 2,749,061
Patented June 5, 1956

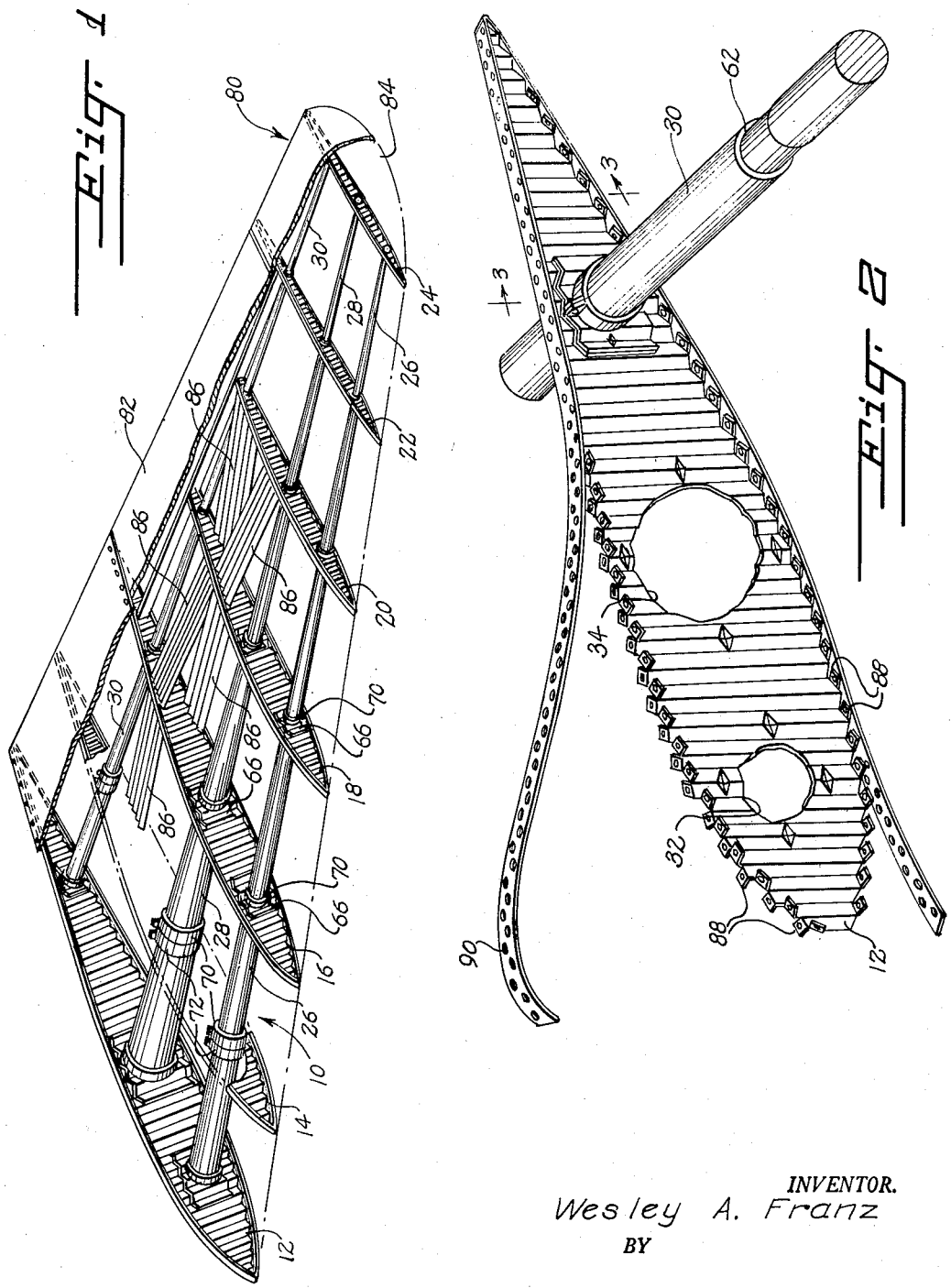

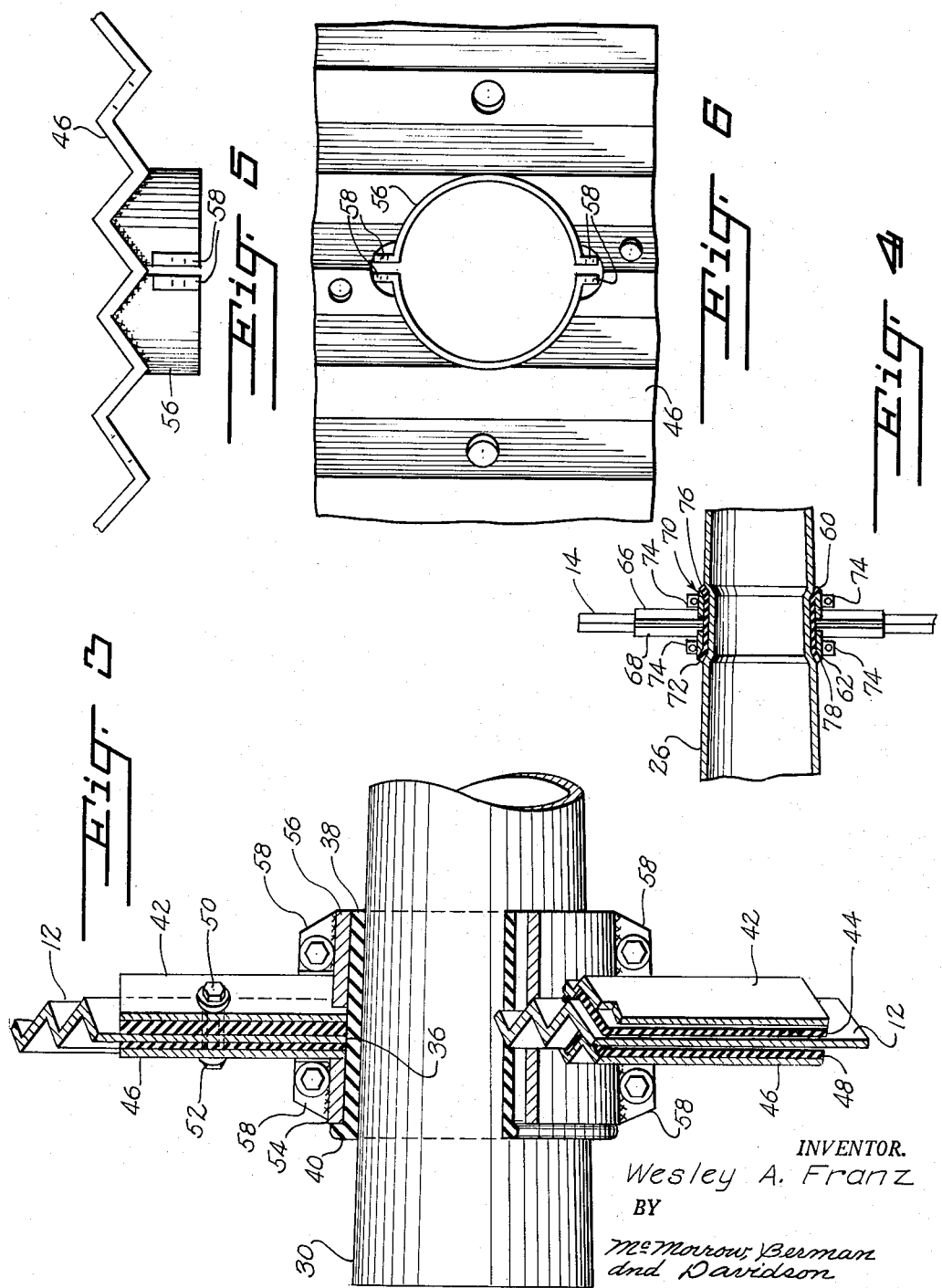

2,749,061

AIRPLANE WING STRESS COMPENSATING STRUCTURE ASSEMBLY

Wesley A. Franz, Fredericksburg, Tex.

Application June 18, 1954, Serial No. 437,717

7 Claims. (Cl. 244—123)

This invention relates to structural assemblies, and more particularly to a structural assembly which compensates for stress applied to the assembly.

It is the primary object of this invention to provide a stress compensating structural assembly in which the stress to be applied to the completed assembly will be compensated for in the assembly without causing any weakening or undue strain on the assembly; which is relatively light in weight and stronger in proportion to its weight than previous structural assemblies; and which may be produced at a much lower cost than the assemblies presently employed.

It is a further object of this invention to provide a stress compensating structural assembly which is especially adaptable for use in the construction of aircraft, for the various parts of an airplane and will result in a material reduction in the cost of producing airplanes, especially small commercial airplanes, so as to place the purchase price of such planes more within the reach of the general public. Also, the structural assembly of this invention, when applied to an airplane construction, will be more durable than present construction assemblies in that it will be less subject to crystallization by virtue of the strength of the portion of the plane to which it is applied and its ability to compensate for pressure uniformly throughout its entire length of structure.

Other objects and advantages will become apparent from a consideration of the following detailed description, forming the specification, and taken in conjunction with the accompanying drawings, in which:

Figure 1 is a perspective view, partially broken away, showing the stress compensating structural assembly embodying this invention as incorporated into a specific embodiment of an airplane wing;

Fig. 2 is a fragmentary perspective view of the endmost one of the supporting members shown at the left of Figure 1, on a somewhat enlarged scale;

Figure 3 is a partial cross sectional view taken substantially on the line 3—3 of Figure 2;

Figure 4 is a vertical cross sectional view through the intersection of a longitudinally extending beam and the transversely extending supporting member other than that shown in Figures 2 and 3;

Figure 5 is a top plan view of the bearing plate and collar secured to the transverse supporting member of Figures 1 and 2; and Figure 6 is a front elevational view of the support plate of Figure 5.

With continued reference to the drawings, there is shown a stress compensating structural assembly including a structural skeleton, generally indicated at 10, having a plurality of spaced structural supporting members disposed transversely of the structural skeleton. The structural supporting members, identified at 12, 14, 16, 18, 20, 22 and 24, have longitudinally spaced aligned openings therethrough. A plurality of structural beams 26, 28 and 30 extend through the aligned openings in the supporting members and longitudinally of the structural skeleton 10.

Means in the form of annular insulators of resilient material, such as rubber or other suitable material, are carried by the beams 26, 28, 30 and operatively connected to the supporting members to provide a flexible connection therebetween at the intersection thereof.

Specifically, and in the case of the case of the supporting members 12, provided with the longitudinally spaced openings 32, 34 and 36, which are of sufficient diameter to receive the structural beam therethrough, with the structural beam carrying thereon an insulator 38 which is seated on the associated beam and providing a flexible connection between the beam and the supporting plate by securing the opening through which the beam extends and projecting to either side of the support member so that the insulator defines a flexible connection between the beam and the supporting member at the intersection thereof to provide the operative connection to the supporting member with which it is associated, this flexible connection being a frictional engagement between the outer surface of the insulator and the adjacent surface of the material of the supporting member surrounding the opening therethrough. The insulator 38 carried by each of the structural beams 26, 28 and 30 at their junctures with the supporting member 12, is provided with an annular lip 40 extending circumferentially about one end thereof and in upstanding relation thereto.

A bearing plate 42 is carried by each of the beams adjacent their juncture with the supporting member 12 and is adapted to be secured to the supporting member by a suitable fastening or securing device such as a bolt and nut passing through suitably aligned apertures, and has an insulator sheet 44 disposed between the adjoining faces of the bearing plate and the structural supporting member 12 on one side of the supporting member.

A similar bearing plate 46 is similarly carried by each of the beams, and in like manner to the bearing plate 42 has an opening centrally therethrough so as to be received upon the insulator 38, and is adapted to be secured to the structural supporting member 12 with an insulator sheet 48, similar to the insulator sheet 44 disposed therebetween. The securing fastening means in the form of bolts 50 and nuts 52 which secure the bearing plate 46 thereto by passing through a suitably aligned aperture therethrough and through the insulator sheet 48 so that the bearing plate 46 is disposed on the side of the supporting member 12 remote from the side to which the bearing plate 42 is secured.

The bearing plates 42 and 46 are the bearing supports for the beam upon which they are carried.

On either side of the structural supporting member 12 and carried on the respective beams passing therethrough, are split bearing collars 54 and 56. Each of the bearing collars is made of two semi-circular sections placed in encircling relation about the insulator 38, and each section carries at its free ends an upstanding ear, similar to the ears 58, as shown in Figure 3, so that the upstanding, laterally projecting ears are in mating relation as the sections of the respective bearing collars are placed about the insulator 38 to be carried by the beam, so that a suitable fastener, such as a screw or bolt and nut arrangement may pass through aligned openings therethrough to secure the bearing collars onto the structural beam and in encircling relation to the insulator 38 for the purpose of retaining the insulator 38 seated upon the beam.

It will be noted that the bearing collar 54 extends between the inner edge of the lip 40 and the adjacent surface of the bearing plate 46. This will tend to maintain the bearing collar 54 in proper relation and against longitudinal movement on the insulator 38. It will be realized, that the insulator 38 may be provided with a similar upstanding, annular lip at its other end.

With respect to the connection between the beams 26, 28, 30 and the other structural supporting members 14, 16, 18, 20, 22 and 24, at the intersection thereof, the specific structure for each intersecting connection is shown in Figure 4, and the description of the one connection will suffice for all.

With particular reference to Figure 4, it is assumed that one of the structural beams 26 passes through one of the openings 60 through a supporting member 14. The beam 26 is provided with an annular recess 62 externally thereabout to provide a seat for an insulator 64 which is of annular form and of a resilient material. The recess 62 having the insulator 64 seated thereon is received in the opening 60 with the insulator extending equally to opposite sides of the supporting member 14. A pair of bearing plates 66 and 68 are disposed to either side of the support member 14 and are carried by the beam 26, and are similar to the bearing plates 42 and 46. The bearing plates are secured to the support member by a plurality of fastening beams such as bolts and nuts in the same manner as the bearing plates 42 and 46.

A pair of annular bearing collars 70 and 72, of the split type, similar to the collars 54 and 56, are encirclingly carried by the insulator 64 on opposite sides of the supporting member 14. Each of the split bearing collars have their opposed semi-circular sections provided with upstanding ears or lugs 74 which are adapted to be placed in mating relation and secured together by a suitable fastening means such as a screw or bolt and nut so as to retain the insulator 64 in its seat 62.

The insulator 64 has upstanding, annular lips 76 and 78 and opposite ends thereof so that the collars 70 and 72 are retained on the insulator 64 between the respective lips 76 and 78 and the adjacent face of the bearing plates 66 and 68, respectively.

Thus, there has been provided a structural assembly including a structural skeleton having a plurality of supporting members with the members having aligned openings therethrough and structural beams extending through the aligned openings in the members, and means defined by the insulators 38 and 64 carried by the beams and operatively connected to the members to provide a flexible connection therebetween at the intersection thereof so that stress applied to the structural skeleton 10 will be distributed equally throughout the structure with the result that no stress is unduly placed at any one of the intersecting connections between the supporting members and the structural beams. Also, the structural supporting member 12, is further provided with a sheet of resilient material in the form of an insulating or insulator sheet 48 disposed between the bearing plate 46 and the supporting member 12 and a similar insulator sheet 44 disposed between the bearing plate 42 and the supporting member 12 on the opposite side thereof, both of the bearing plates and their associated insulator sheets are carried by the structural beam. This arrangement provides a further resilient connection between the beams and the supporting member 12 whereby stress applied to the supporting member 12 will be equally distributed thereon to the compressibility of the insulating sheets.

It will be apparent that the stress compensating structure assembly hereinbefore described can be employed in various types of structures, and particularly adaptable to aircraft structure wherein the structural skeleton may be employed in the fabrication of the various major structural component parts thereof, and for the purposes of illustration, the present drawings show a specific embodiment of the structural assembly as employed in the fabrication of an airplane wing, generally indicated at 80, and in which the structural skeleton 10 is enclosed by a covering or skin 82.

The structural supporting members are disposed in spaced parallel relation and are consecutively of smaller size, diminishing from the member 12 to the member 24 so as to lend the proper shape to the wing, each of the structural supporting members being so peripherally formed as to lend the proper curvature.

Each of the structural supporting members may be made of corrugated steel or aluminum of the required strength, each being lighter in weight as they are placed toward the outer end 84 of the wing 80.

The structural beams 26, 28 and 30 are tubular in form and extend longitudinally of the wing. The number of beams required may be varied with the requirement of the load and stress the wing will be subjected to in use, and the weight of the beams will also be proportional to these considerations.

The hollow tubular beams taper from the inner end, adjacent the supporting member or strut 12 toward the outer end 84 of the wing 80. At each intersection of the beams with the transverse struts or supporting members, there is provided a flexible connection of the construction hereinbefore described, so that no metal-to-metal contact is present, and the insulators, which may be vulcanized to the spars or supporting members, are of such size as to permit the beams to pass freely therethrough and thus allow for movement caused by expansion or pressure on the wing 80.

Between the adjacent supporting members, there is provided in the wing 80 corrugated stiffening members 86 which are annularly disposed so as to be anchored at opposite ends at the or adjacent the top of one supporting member and adjacent or at the bottom of the adjoining supporting member or strut. These stiffening members will be employed in such number as required by the load and stress to which the wing 80 is to be subjected in use, for the purpose of providing the required rigidity thereto.

Each of the spars or structural supporting members extending transversely of the wing 80, are provided with laterally projecting ears 88 along opposite peripheral edges thereof with the ears 88 alternating in the direction to which they extend, so that alternate ones of the ears project to the same side of the spar. A mounting strip 90 of flat sheet metal of material is provided with a plurality of spaced openings therethrough which are adapted to register with the openings through each of the ears 88 when the strip is placed peripherally about the strut or supporting member. The covering 82 may then be secured to the skeleton 10 by suitable fastening means passing therethrough and through the registering apertures or openings in the mounting strip 90 and the laterally projecting ears carried by the respective structural supporting members.

While there is shown and described the preferred embodiment of the invention, it is to be understood that the structure is susceptible to change and modification within the practicability of the invention and therefore should be limited only by the scope of the claims appended hereto.

What is claimed is:

1. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; annular insulators seated upon said beams and operatively connected to said spars to provide a flexible connection therebetween at the intersection thereof, one of said insulators disposed within each of said openings in said spars, said spars being of corrugated sheet material and said beams being of hollow tubular form tapering from one end thereof to the other end adjacent the outer tip of said wing, each of said insulators defining the flexible connection between said beams and the endmost one of said spars remote from the wing tip including an upstanding annular lip at one end thereof, a pair of corrugated bearing plates mounted on each of said insulators, said plates being secured to said spar with one plate disposed at opposite sides thereof, a split collar carried by each of the insulators at opposite sides of said spar and concentric with the opening therethrough, means for tightening said collars about said insulator to maintain it seated upon said beam, one of said collars extending between said lip and the adjoining bearing plate for retaining the collar against longitudinal movement.

2. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; annular insulators seated upon said beams and operatively connected to said spars to provide a flexible connection therebetween at the intersection thereof, one of said insulators disposed within each of said openings in said spars, said spars being of corrugated sheet material and said beams being of hollow tubular form tapering from one end thereof to the other end adjacent the outer tip of said wing, each of said insulators defining the flexible connection between said beams and the endmost one of said spars remote from the wing tip including an upstanding annular lip at one end thereof, a pair of corrugated bearing plates mounted on each of said insulators, said plates being secured to said spar with one plate disposed at opposite sides thereof, a split collar carried by each of the insulators at opposite sides of said spar and concentric with the opening therethrough, means for tightening said collars about said insulator to maintain it seated upon said beam, one of said collars extending between said lip and the adjoining bearing plate for retaining the collar against longitudinal movement, and an insulating sheet of resilient material disposed between each of said bearing plates and said spar.

3. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; annular insulators seated upon said beams and operatively connected to said spars to provide a flexible connection therebetween at the intersection thereof, one of said insulators disposed within each of said openings in said spars, said spars being of corrugated sheet material and said beams being of hollow tubular form tapering from one end thereof to the other and adjacent the outer tip of said wing, each of said insulators defining the flexible connection between said beam and the endmost one of said spars remote from the wing tip including an upstanding annular lip at one end thereof, a pair of corrugated bearing plates mounted on each of said insulators, said plates being secured to said spar with one plate disposed at opposite sides thereof, a split collar carried by each of the insulators at opposite sides of said spar and concentric with the opening therethrough, means for tightening said collars about said insulator to maintain it seated upon said beam, one of said collars extending between said lip and the adjoining bearing plate for retaining the collar against longitudinal movement, said beams having annular recesses spaced longitudinally thereof to define seats for said insulators at the intersection of said beams with the other of said spars spaced from said endmost one thereof.

4. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; annular insulators seated upon said beams and operatively connected to said spars to provide a flexible connection therebetween at the intersection thereof, one of said insulators disposed within each of said openings in said spars, a bearing plate carried by said beams disposed at either side of each of said flexible connections and secured to opposite sides of the associated spar, a pair of collars carried by each of said insulators seated in said openings, one of said collars disposed at an opposite side of an associated spar, means to tighten said collars about the insulator for maintaining said collars seated in said openings.

5. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; insulators seated upon said beams and operatively connected to said said spars to provide a flexible connection therebetween at the intersection thereof, one of said insulators disposed within each of said openings in said spars, an upstanding annular lip carried by each of said insulators at one end thereof, a collar carried by each of the insulators at opposite sides of the associated spar and concentric with the opening therethrough, one of said collars extending between said lip and said associated spar for retaining the collar against longitudinal movement.

6. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; insulators seated upon said beams and extending through said openings and operatively connected to said spars to define flexible connections between said beams and said spars at the intersections thereof, a pair of bearing plates mounted on each of said insulators, said plates being secured to an associated spar with one plate disposed at an opposite side thereof, a collar carried by each of the insulators at opposite sides of said associated spar and concentric with the opening therethrough, an upstanding annular lip carried by each of said insulators at one end thereof, one of said collars extending between said lip and the adjoining bearing plate for retaining the collar against longitudinal movement, and an insulating sheet of resilient material disposed between each of said bearing plates and said associated spar.

7. In an airplane wing, a stress compensating structure including a structural skeleton, a wing covering carried by said skeleton, said structural skeleton comprising a plurality of spaced transverse spars having aligned openings therethrough and structural beams extending through the aligned openings in said spars; insulators seated upon said beams and extending through said openings and operatively connected to said spars to define flexible connections between said beams and said spars at the intersections thereof, each of said insulators including an upstanding annular lip at one end thereof, a collar arranged in concentric relation about the openings through each of said spars on opposite sides thereof and carried by the insulators seated within each of the openings, one of said collars on each of the insulators extending between said lip and the adjacent side of the spar for retaining the collar against longitudinal movement, at least one of said means having an annular recess at the intersection thereof with one of said spars to define a seat for the insulator providing the flexible connection at said last-mentioned intersection.

References Cited in the file of this patent

UNITED STATES PATENTS

| | | |
|---|---|---|
| 1,343,707 | Carns | June 15, 1920 |
| 1,674,941 | Bart | June 26, 1928 |
| 1,830,991 | Fox | Nov. 10, 1931 |
| 2,356,918 | Courtney | Aug. 29, 1944 |
| 2,486,710 | Gluhareff | Nov. 1, 1949 |

FOREIGN PATENTS

| | | |
|---|---|---|
| 563,207 | Great Britain | Nov. 1, 1944 |
| 634,884 | Germany | Sept. 5, 1936 |